July 7, 1970 R. J. FRENCH ET AL 3,519,535
NUCLEAR FUEL ASSEMBLY WITH PLURAL INDEPENDENT CONTROL
ELEMENTS AND SYSTEM THEREFOR
Filed Jan. 24, 1968 2 Sheets-Sheet 1
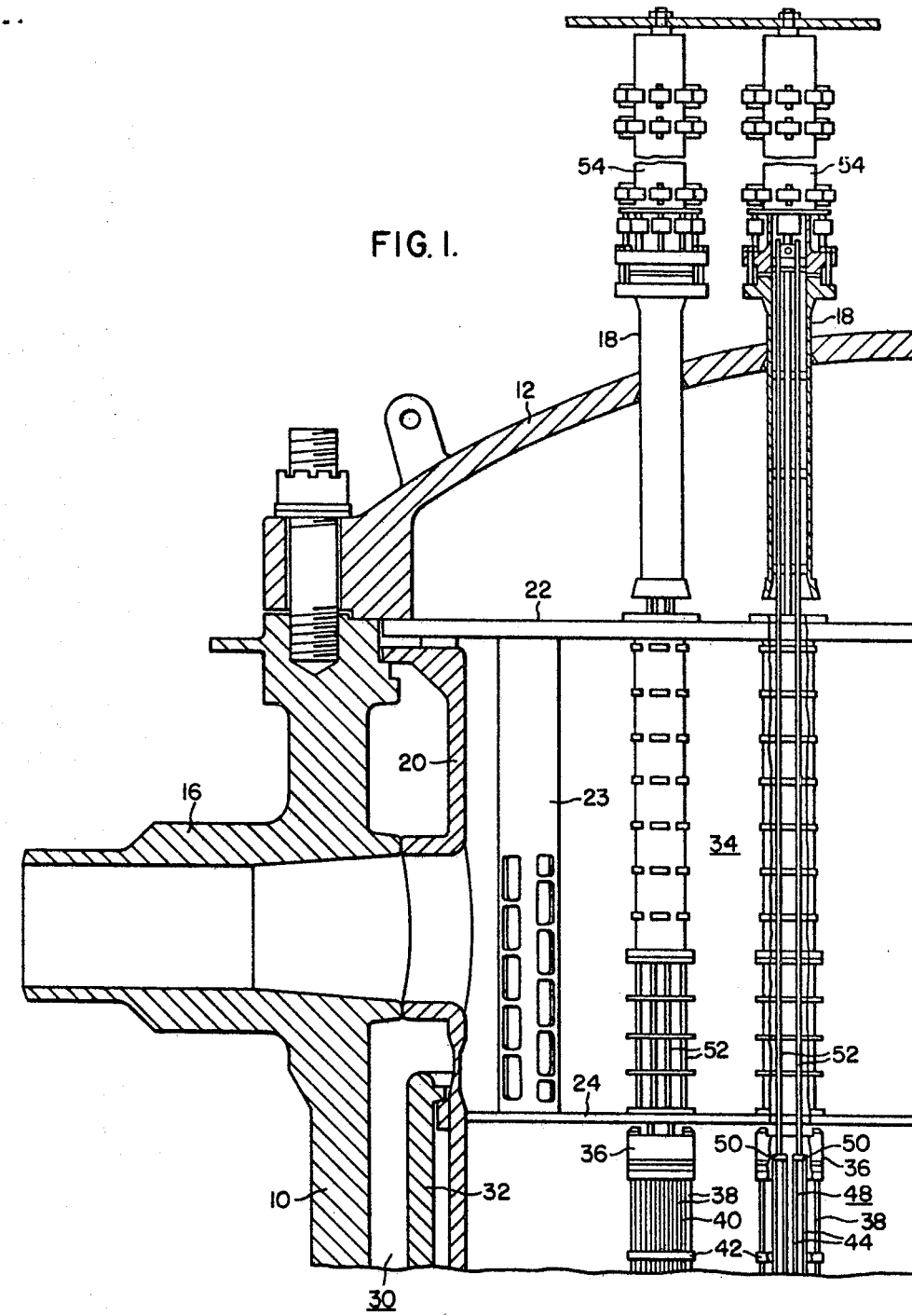
FIG. I.
WITNESSES
Theodore F. Wrobel
Michael B. L. Zappa
INVENTORS
Robert J. French and
Harry N. Andrews
BY
Zygmund L. Werner
ATTORNEY

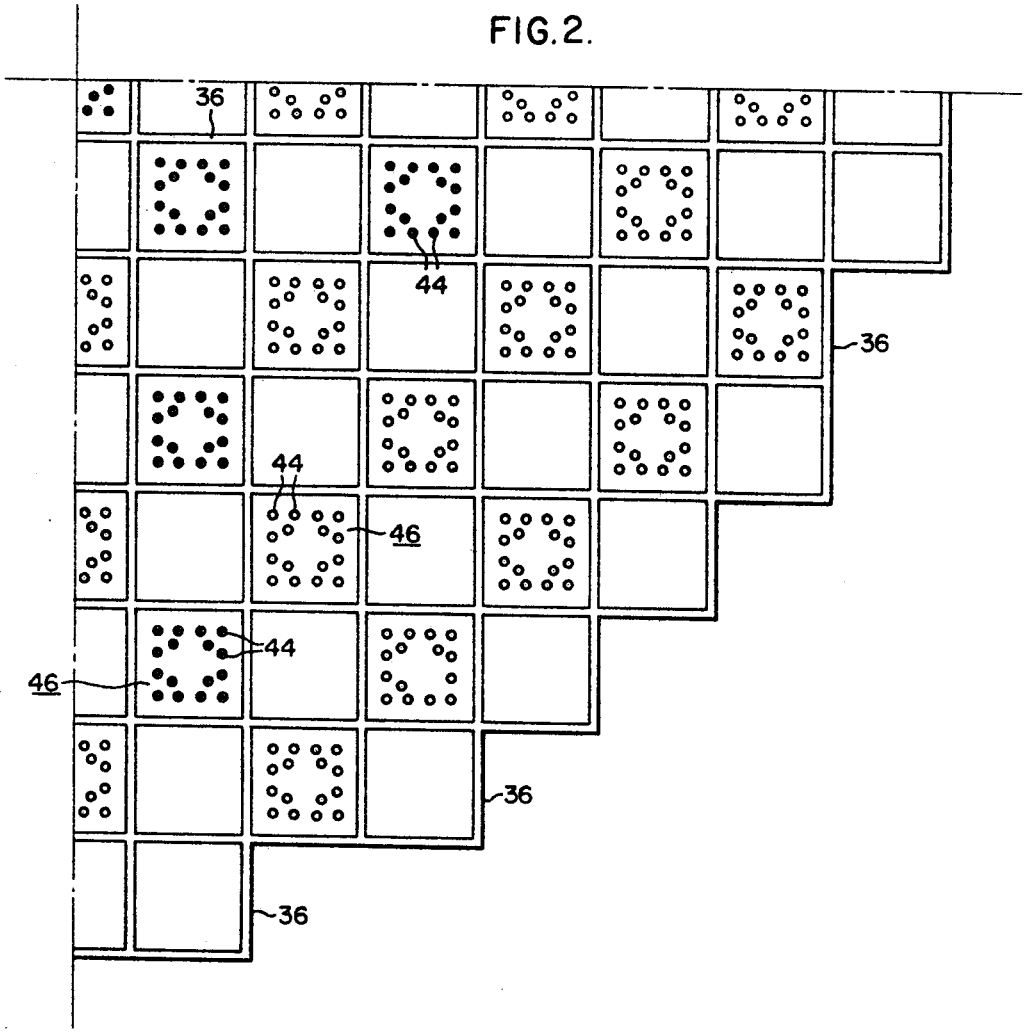

United States Patent Office 3,519,535
Patented July 7, 1970

3,519,535
NUCLEAR FUEL ASSEMBLY WITH PLURAL INDEPENDENT CONTROL ELEMENTS AND SYSTEM THEREFOR
Robert J. French, Pittsburgh, and Harry N. Andrews, Monroeville, Pa., assignors to Westinghouse Electric Corporation, Pittsburgh, Pa., a corporation of Pennsylvania
Filed Jan. 24, 1968, Ser. No. 700,153
Int. Cl. G21c 7/08
U.S. Cl. 176—35                            6 Claims

ABSTRACT OF THE DISCLOSURE

A nuclear reactor is disclosed which has a plurality of fuel assemblies consisting of commingled fuel rods and guide tubes. A portion of these fuel assemblies have a plurality of two-position control elements or neutron absorbers which can be telescoped within their respective guide tubes. Each individual control element, which may have more than one control module associated therewith, may be removed or inserted independent of the remaining control elements. The reactor can therefore be more efficiently controlled and may be utilized for load follow service.

BACKGROUND OF THE INVENTION

This invention pertains to nuclear reactors, and more particularly to the control systems by which the neutron flux of such a reactor can be varied throughout the life of its core.

Prior art control systems generally relied upon a combination of incrementally movable and heterogeneously dispersed neutron absorbers and a diffused and generally homogeneous poison system to control the flux distribution and power density of its reactive core. The preferred neutron absorbing configuration or control element took the form of a plurality of clustered poison modules associated with selected fuel assemblies. These control elements are of a relatively high worth and are coupled to mechanisms which incrementally lower or raise the entire cluster relatively to stationary fuel assemblies so as to respectively absorb more or fewer neutrons.

Such reactors of the prior art have several limiting characteristics. The radial flux distribution is not always uniform, the axial flux distribution becomes perturbed during partial insertions causing xenon cycling, and the mechanisms for controlling the incrementally movable control elements are relatively expensive.

The overall power level that may be safely and efficiently sustained is effected by radial flux peaks. Such peaks are an inherent characteristic of a non-homogeneous nuclear core. In other words, the distance of each fuel pin from surrounding control elements, thermalizing water channels, diffused poison concentrations, etc. controls the flux in its vicinity. Since the distances vary from pin to pin, the flux density and power density also vary.

Axial variations in flux density and power density result from partial insertion of control elements and produce several severe limitations on reactor utilization. A control element only absorbs significant numbers of neutrons in those lateral regions through which it has passed. The resulting flux bulge multiples the hot channel factor and thus directly limits the power level which can be achieved. Since xenon concentration follows power or flux density variations, the flux disparities start xenon cycling which renders a reactor difficult to control. This last mentioned factor also appears to be a substantial obstacle to the use of control elements for accurate load follow service. Xenon concentration physics is discussed at length in Pat. No. 2,708,656 to E. Fermi et al. issued May 17, 1955.

Mechanisms for the control of incrementally movable control elements are more expensive than two-position mechanisms. The number of such control elements utilized in a nuclear reactor is therefore necessarily a compromise of marginal increases in efficiency to increases in the cost of additional mechanisms and their associated structure.

SUMMARY OF THE INVENTION

This invention solves the aforementioned problems of the prior art by associating a plurality of separately movable two-position neutron absorbers with a portion of the fuel assemblies.

As reactors become larger, it becomes increasingly necessary to provide a wide and heterogeneous dispersal of individually movable control elements to achieve sufficient flux shaping to produce a reasonble peak to average power density. Such an expendency is desirable to improve the hot channel factor and permit operation at higher power levels. Moreover, load follow service requires control elements capable of varying the power level in a nuclear reactor without producing a power density distribution which would initiate xenon cycling.

It is accordingly the primary object of this invention to provide a nuclear reactor control system, characterized as a heterogeneous dispersal of movable neutron absorbers, which has sufficient flexibility to suppress axial and radial flux peaks and to change the overall power level of a nuclear core without causing power disparities and the attendant xenon cycling.

The solution proposed has two primary characteristics: a portion of the fuel assemblies have a plurality of individually movable control elements, and each control element is at all times either completely inserted in its associated fuel assembly or completely removed therefrom.

The provision of a plurality of separately movable control elements with each selected fuel assembly allows the operator of a nuclear reactor to insert that amount to neutron absorbing material necessary to suppress local flux peaks as well as to perform usual control functions. This was previously impossible to achieve since present control elements have too much worth to be utilized for local radial flux suppression.

All-in or all-out control elements have several advantages over incrementally inserted control elements. The axial flux bulge which results from the partial insertion of a control element is no longer a factor in calculating power densities. Suppression of power density disparities also means that the xenon concentrations which follow such disparities are obviated. And, since xenon cycling presents a major obstacle to load following, this important service can now be provided for in future power plants.

Moreover, the use of two-position control elements means that simple control elements and position indicators can be utilized. This also means that a greater number of control elements becomes economically feasible.

DESCRIPTION OF THE DRAWINGS

For a better understanding of the invention, reference may be had to the accompanying drawings in which:

FIG. 1 is a partial elevation view of a nuclear reactor, partially in section, which incorporates the control means of this invention;

FIG. 2 is a quarter-core section of an arrangement of fuel assemblies showing schematically the placement of absorber modules.

DESCRIPTION OF THE PREFERRED EMBODIMENTS

Referring to FIG. 1 there is illustrated a nuclear reactor incorporating the control system of this invention. A pressure vessel 10 is shown which forms a tight pressurized container when sealed by a head assembly 12. The pressure vessel 10 has coolant flow inlet nozzles (not shown) and coolant flow outlet nozzles 16 in and through its cylindrical wall as conventional in nuclear power reactors. The head assembly 12 has a plurality of head penetration adapters 18 sealed in and through its substantially hemispherical wall. These head penetration adapters 18 are aligned parallel with the axis of the pressure vessel 10. A core barrel 20 is supportedly suspended from an inwardly extending projection just below the top of the pressure vessel 10. An upper support plate 22 and an upper core plate 24 which form a sturdy upper-structure when joined by columns 23 are substantially supported by the core barrel 20. As is conventional, a lower core plate (not shown) is also substantially supported by the core barrel 20.

Coolant flow entering through the inlet nozzles proceeds to a bottom coolant plenum through a flow annulus 30 formed by the lower walls of the pressure vessel 10 and the core barrel 20. The flow annulus 30 also contains a radiation shield 32. From the bottom coolant plenum, the flow proceeds generally axially upward through the area between the core plates to an upper plenum region 34 from which it then proceeds through outlet nozzles 16 to energy conversion structure (not shown).

A parallel array of fuel assemblies 36 are suspended between the upper core plate 24 and the lower core plate and are accurately located relative to said plates by dowel pins. The array of fuel assemblies 36 includes a plurality of fuel rods or pins 38 and a plurality of guide tubes 40 interspersed therebetween and held in a fixed relationship each to the other by an egg-crate type structure 42. The design of this so-called canless fuel assembly is shown and described in a copending application Ser. No. 522,976, filed May 25, 1966, now abandoned, by Creagan and Frisch for a Fuel Assembly for Nuclear Reactors and assigned to the present assignee. The guide tubes 40 serve as receptacles for the individual control modules 44 of the various control groups 46, as contemplated by this invention.

Control modules 44 are constructed of a neutron absorber material such as silver-indium-cadmium clad with a high temperature non-corrosive metal such as stainless steel. The control modules 44 are approximately the length of a guide tube 40 so that each module 44 uniformly absorbs neutron across the entire core when inserted. However, it is recognized that some partial length control modules, i.e., control modules having a material of low or negligible neutron capture cross-section for part of its length, might be necessary to compensate for irregularities in the axial flux distribution. The worth of a single control module 44 is so calibrated that the insertion of one or two such modules will not greatly reduce or change the power distribution of the entire core as would the insertion of an entire control group 46. However, a single control module 44 would have enough worth to incrementally reduce the flux distribution in its immediate environs.

A control group 46 might consist of sixteen control modules 44. Eight control elements 48 each comprising two control modules 44 joined by header 50 are used to provide flexibility in control and simplify mechanical requirements. Each control element 48 is individually movable and adapted to be either completely inserted or completely removed from the nuclear core of the reactor. For this purpose headers 50 are attached to drive shafts 52 which extend into suitable lifting mechanisms 54. One such mechanism 54 and its associated structure is the subject of a copending application No. 700,121, filed Jan. 24, 1968, by Frisch and Andrews for a Control Element Drive Mechanism, and assigned to the present assignee.

By way of example, a typical core configuration according to this invention is shown in FIG. 2, and may be characterized as a heterogeneous dispersal of movable neutron absorbers. This core configuration has one hundred fifty seven identical fuel assemblies 36; as described above. Control means, in accordance with this invention and described above, are associated with sixty nine of these fuel assemblies 36. Thus, the nuclear reactor has five hundred fifty two control elements 48 and eleven hundred and four control modules 44. The inherent flexibility resulting from such a wide and heterogeneous dispersal of individually movable control means in combination with a chemical shim or other substantially homogeneous control system utilizing boric acid substantially improves the hot channel factor and permits operation of the reactor at higher power levels. Although the configuration, as shown, is not necessarily an optimizing one from a physics viewpoint, it is projected to yield as much as 15% more power than is possible utilizing the best of conventional control systems. This system would also permit changes in reactor power output making it possible to utilize this reactor for complete load follow service as contrasted with base load service for which nuclear reactors are presently employed.

The operation of a nuclear reactor equipped with the control means of this invention is similar to that of conventional reactors with two major exceptions. A lower power level is initiated by fully inserting selected control elements 48 rather than by partially inserting one or more high worth clusters. And, radial flux peaks need no longer be tolerated since individual control elements 48 can be inserted to lower such peaks without initiating serious axial perturbations and zenon poisoning cycles. It is therefore to be noted that the modular approach to reactor control of this invention does not materially change the operation of nuclear reactors so as to necessitate a reappraisal of present well known control modes, but rather yields greater flexibility while minimizing undesirable effects resulting from particular control sequences.

While there have been shown and described what are at present considered to be the preferred embodiment of the invention, modifications thereto will readily occur to those skilled in the art. In particular, a control element may comprise only one control module, or may consist of several control modules depending upon the physics and structural arrangement of each reactor. It is not intended, therefore, that the invention be limited to the specific arrangements shown and described and it is intended to cover in the appended claims all such modifications as fall within the true spirit and scope of the invention.

Therefore, we claim:

1. A nuclear reactor comprising, in combination, a vessel having coolant inlet and outlet openings therein, an upper plenum and a lower plenum within said vessel and having a reactor core fixedly positioned therebetween with coolant flow channels therethrough, fuel assemblies within said reactor core and comprising a substantially fixed array of commingled and spaced fuel elements and control module guide tubes which are so coupled as to be inserted in and removed from the reactor core as a unit, said reactor core having a fixed active length, control elements associated with at least a portion of said fuel assemblies, and said reactor including more than one separately movable control element for movement into and out of each fuel assembly of said portion of said fuel assemblies, said separately movable control elements being the sole movable heterogeneous dispersal of neutron absorbing material.

2. The nuclear reactor of claim 1 wherein each said separately movable control element is movable only to two-positions, one of said positions being with the control element fully inserted in said reactor core so as to coextend with the active length thereof and the other of said positions being with the control element fully withdrawn therefrom.

3. A fuel assembly and control device including a fuel assembly comprising a substantially fixed array of commingled and spaced fuel elements and control module guide tubes, said fuel elements having fixed active length control modules adapted to be telescoped within said guide tubes, headers joining selected ones of said control modules and coupled to drive shafts so as to form individually movable control elements, said fuel assembly having more than one such control element located therein.

4. The fuel assembly and control device of claim 3 wherein each said control element is a two-position control device.

5. The fuel assembly and control device of claim 3 wherein the said control modules are approximately equal in length to the active length of said fuel elements and comprise a neutron absorbing material for substantially their full length.

6. The fuel assembly and control device of claim 3 wherein a portion of the said control modules include a neutron absorbing material for a distance less than the active length of said fuel elements.

References Cited

UNITED STATES PATENTS

| | | | |
|---|---|---|---|
| 2,852,458 | 9/1958 | Dietrich et al. | 176—35 |
| 3,379,619 | 4/1968 | Andrews et al. | 176—78 |

BENJAMIN R. PADGETT, Primary Examiner

H. E. BEHREND, Assistant Examiner